United States Patent
Kumamoto et al.

[11] Patent Number: 5,760,575
[45] Date of Patent: Jun. 2, 1998

[54] ROTOR FOR ABS WHEEL SPEED SENSOR AND METHOD OF MANUFACTURING THE SAME ROTOR

[75] Inventors: Yukio Kumamoto, Yokohama; Masayuki Suzuki, Atsugi; Naoto Taguchi, Matsudo, all of Japan

[73] Assignee: Nissan Motor Co., Ltd., Yokohama, Japan

[21] Appl. No.: 783,062

[22] Filed: Jan. 15, 1997

Related U.S. Application Data

[63] Continuation of Ser. No. 558,509, Nov. 16, 1995, abandoned.

[30] Foreign Application Priority Data

Nov. 16, 1994 [JP] Japan ............................ 6-281050

[51] Int. Cl.$^6$ .......................... G01P 3/48; G01P 3/54; G01B 7/30
[52] U.S. Cl. .................. 324/173; 324/207.25; 384/448; 29/428
[58] Field of Search .................. 324/207.25, 173, 324/174, 207.22, 207.11; 384/446, 448; 29/593, 595, 602.1, 724, 607, 428, 432

[56] References Cited

U.S. PATENT DOCUMENTS

| | | | |
|---|---|---|---|
| 4,460,284 | 7/1984 | Lauterbach et al. | 384/126 |
| 4,478,325 | 10/1984 | Dagiel | 192/98 |
| 4,795,278 | 1/1989 | Hayashi | 384/448 |
| 4,915,199 | 4/1990 | Hayashi | 188/181 A |
| 4,916,390 | 4/1990 | Christoleit et al. | 324/174 |
| 4,974,309 | 12/1990 | Hattori et al. | 29/513 |
| 5,018,384 | 5/1991 | Hayashi et al. | 73/118.1 |
| 5,053,656 | 10/1991 | Hodge | 310/42 |
| 5,121,998 | 6/1992 | Bhatia | 384/448 |
| 5,166,611 | 11/1992 | Kujawa, Jr. et al. | 324/166 |
| 5,234,269 | 8/1993 | Grillo et al. | 384/446 |

*Primary Examiner*—Sandra L. O'Shea
*Assistant Examiner*—Jay M. Patidar
*Attorney, Agent, or Firm*—Foley & Lardner

[57] ABSTRACT

A rotor for an ABS wheel speed sensor which is capable of improving the yield of a material and a work effectiveness at assembly. The rotor 1 includes a ring-like rotor body 3 having a number of holes 2 arranged successively at an equal pitch, and an inner ring 4 having a C-shaped cross section and having, at at least one of its axial end portions, a flange section 6 bent and protruding outwardly. The inner ring is fitted in the interior of the rotor body 3. For coupling the inner ring 4 into the rotor body 3, the inner ring 4 is elastically deformed in diameter-reducing directions. In addition, the inner circumferential surface of the inner ring 4 is fitted onto a mating rotary shaft from the flange section side under pressure.

12 Claims, 12 Drawing Sheets

ROTOR FOR ABS WHEEL SPEED SENSOR AND METHOD OF MANUFACTURING THE SAME ROTOR

This application is a continuation of application Ser. No. 08/558,509, filed Nov. 16, 1995, now abandoned.

BACKGROUND OF THE INVENTION

1. Field of the Invention

The present invention relates to a rotor making up a wheel speed sensor in an anti-locked brake system (which will hereinafter be referred to as an ABS) for motor vehicles to a mating rotary shaft, and further to a method of manufacturing the rotor.

2. Description of the Prior Art

One example of a wheel speed sensor useful for an ABS is shown generally at reference numeral 101 in FIG. 1, as comprising a rotor 103 integrally fixed to a hub (rotary shaft) 102 engaging with a wheel of a motor vehicle and a sensor body 106 made up of a combination of a magnet 104 and a coil 105. Around the sensor body 106, a magnetic flux 107 takes place due to the magnet 104. In addition, the rotor 103 has a number of holes 108 made to be arranged successively at an equal interval (pitch) so as to substantially form a gear-like irregular surface. When the irregular surface of the rotor 103, rotatable with the wheel, crosses the magnetic flux 107, its magnetic flux density varies so that an electromotive force arises. The voltage variation due to the occurrence of the electromotive force is inputted as a wheel speed signal into an ABS control unit 109.

The important function of the aforesaid rotor 103 is subject to the pitch accuracy of the number of holes 108 and the gap accuracy relative to the magnet 104. Accordingly, as exemplified in FIGS. 2 and 3 and disclosed in Japanese Published Patent Application No. 6-14058, an inner ring 111 having a number of projections 110 made in its axial one end portion at an equal interval is engaged with an outer ring 113 having a number of comb teeth 112 in such a manner the comb teeth 112 are fitted into spaces between the projections 110 of the inner ring 111, and subsequently the tip portions of the comb teeth 112 are processed to be bent inwardly to form caulked portions 114 so that both the rings 111 and 113 come into an integral or unitary combination with each other.

Moreover, another structure of the rotor 103 is such that an inner ring having a C-shaped cross section, which is configured by rolling process of a flat plate, is fitted into the interior of an outer ring having a number of holes arranged successively at an equal pitch, and that the inner ring with the outer ring is press-fitted to the mating or associated rotary shaft.

In either case, an inner ring is disposed in the inner circumference of a separate outer ring, thus preventing rust developed on the rotary shaft engaged with the rotor from advancing up to the outer circumferential surface of the rotor.

However, the former rotor construction suffers from a problem that, since for the formation of both the inner ring 111 and the outer ring 113 a disc-like material is once sinking-formed into a cup-like configuration before its bottom portion is punched to provide a ring-like configuration, not only processing man-hour is large, but also the yield of the material is extremely low. In addition, since the pitch of the irregular section configured on the outer circumferential surface of the rotor is determined in a state where the projections 110 of the inner ring 111 punching-formed using a press are engaged with the comb teeth 112 of the outer ring 113 similarly punching-formed with a press from a development configuration, the pitch accuracy of the irregular section directly relies on the dimension accuracy and dimension stability at the shorn surfaces of the projections 110 and the comb teeth 112, with the result that limitation is imposed on the improvement of the pitch accuracy.

Furthermore, since in the aforementioned rotor construction the comb tooth 112 portions of the outer ring 113, radially punching-processed at the disc-like material stage, are wholly drawn into a cup-like shape so as to be bent to make a 90-degree angle, there is a tendency that the pitch of the comb teeth 112 goes uneven and, particularly, difficulty can be experienced to smoothly engage the comb teeth 112 with the projections 110 of the inner ring 111, with the result that the work effectiveness can deteriorate at assembly.

Moreover, in the latter rotor construction the inner ring tends to deform at the time of the press-fitting with the mating rotary shaft, which places limit upon the reduction of the wall thickness of the inner ring. This increases the manufacturing cost of the inner ring and also raises the whole height of the rotor, with the result that limitation is imposed on the location of the sensor body to be combined with the rotor.

SUMMARY OF THE INVENTION

The present invention has been developed with a view to eliminating above-described problems, and it is therefore an object of the present invention to provide a rotor and a method of manufacturing the rotor which are capable of reducing the processing man-hour and improving the work effectiveness at assembly, coupled with improving the yield of the material to sharply decrease the manufacturing cost.

The present invention provides a rotor comprising a ring-like rotor body having a number of holes arranged successively at an equal pitch, and an inner ring with a C-shaped cross section fitted in the interior of the rotor body and having, at at least one of its axial end portions, a flange section bent and protruding outwardly, the inner circumferential surface of the inner ring being fitted onto the mating rotary shaft from the flange side under pressure.

That is, the inner ring with a C-shaped cross section is fitted in the inside of the rotor body while being elastically deformed in a ring diameter reducing direction, before released from the deforming force so that the inner ring is restored due to the self-elastic force to come closely into contact with the rotor body to constitute a connection therewith. In addition, when the rotor body and the inner ring are together fitted onto the mating rotary shaft from the flange side under pressure, then the rotor body is firmly fixed thereto by means of the diameter-enlarging force of the inner ring. At this time, because the bending formation of the flange section of the inner ring produces a round-chamferred area at the base, or proximal, portion of the flange section, a smooth engagement with the mating rotary shaft is possible.

In this rotor construction, since the inner ring having a C-shaped cross section and equipped with the flange section is fitted into the interior of the rotor body having a number of holes and the resultant rotor is fitted onto the mating rotary shaft from the flange section side under a pressure and fixedly secured thereto, easy deformation of the inner ring is inhibited due to the provision of the flange section at fitting under pressure, with the result that the wall thickness of the inner ring can be reduced to permit the size reduction of the resultant rotor. In addition, the inner ring can be fitted into the rotor body by only the diameter reduction utilizing its self-elasticity, which can improve the work effectiveness at assembly of the rotor.

The present invention also provides a method of manufacturing the rotor comprising the steps of rolling-forming a flat steel plate material with a number of holes punched at an equal pitch into a ring-like configuration, abutting both ends of the rolling-formed steel plate material against each other and welding both the ends to fabricate a rotor body, rolling-forming another flat steel plate material into a generally C-shaped cross section, forming, at at least one of both axial end portions of the rolling-formed steel plate material, a flange section bent and protruding outwardly to thus fabricate an inner ring, and inserting the inner ring into the inside of the rotor body in a state where the inner ring is elastically deformed in a ring diameter reducing direction so that the outer circumferential surface of the inner ring is engaged with the inner surface of the rotor body under pressure.

This manufacturing method is based on rolling-forming a steel plate material into a ring-like configuration for each of the rotor body and the inner ring making up the rotor and, hence, can reduce the waste of the material concurrent with reducing the number of processing steps, besides improving the work effectiveness at assembly, for that the rotor can be constructed in such a simple way that the inner ring is fitted into the rotor body while being elastically deformed.

In a preferred embodiment of the present invention, for rolling-forming the rotor body steel plate material having a number of holes punching-made successively at an equal pitch, a shorn surface (portion) in the punching-made surface of each of the holes is positioned at the outer circumferential surface side.

More specifically, for rolling formation, in each of the punching-made surfaces of a number of holes punching-formed previously in the steel plate material for the rotor body, the shorn surface formed at the early stage of the punching is positioned at the outer circumferential surface side of the rotor body with respect to the broken surface formed at the later stage of the punching. Since the shorn surface is clearer and higher in accuracy than the broken surface, it is possible to improve the hole pitch accuracy and the sensing performance of the wheel speed sensor.

In another preferred embodiment of the present invention, for abutting both the ends of the rolling-formed rotor body steel plate material to weld both the ends thereof, a high-density melting energy is applied so that the steel plate material portions at both sides of the abutment surface is molten.

That is, for abutting and welding both the ends of the rolling-formed steel plate material for the rotor body, adopted is such a welding method as a plasma welding method, a laser welding method, and a TIG welding method using a high-density melting energy. This welding method does not require a deburring operation at a later step and, hence, can reduce the number of manufacturing steps, because of specially creating indentations in both the surfaces of the welded portion but not producing a convex configuration therein.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 5:
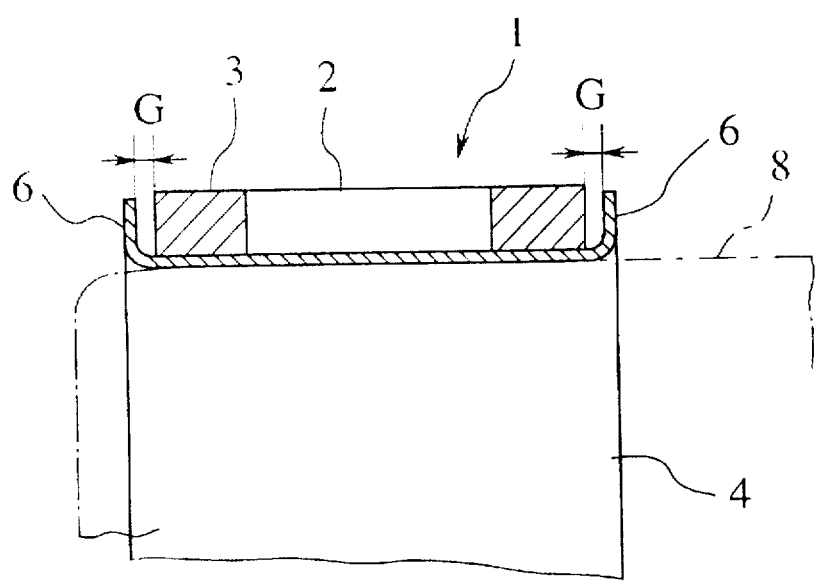
FIG. 5 is a cross-sectional view wholly showing the rotor according to the same embodiment, character A being enlarged in FIG. 4.
Figure 6:
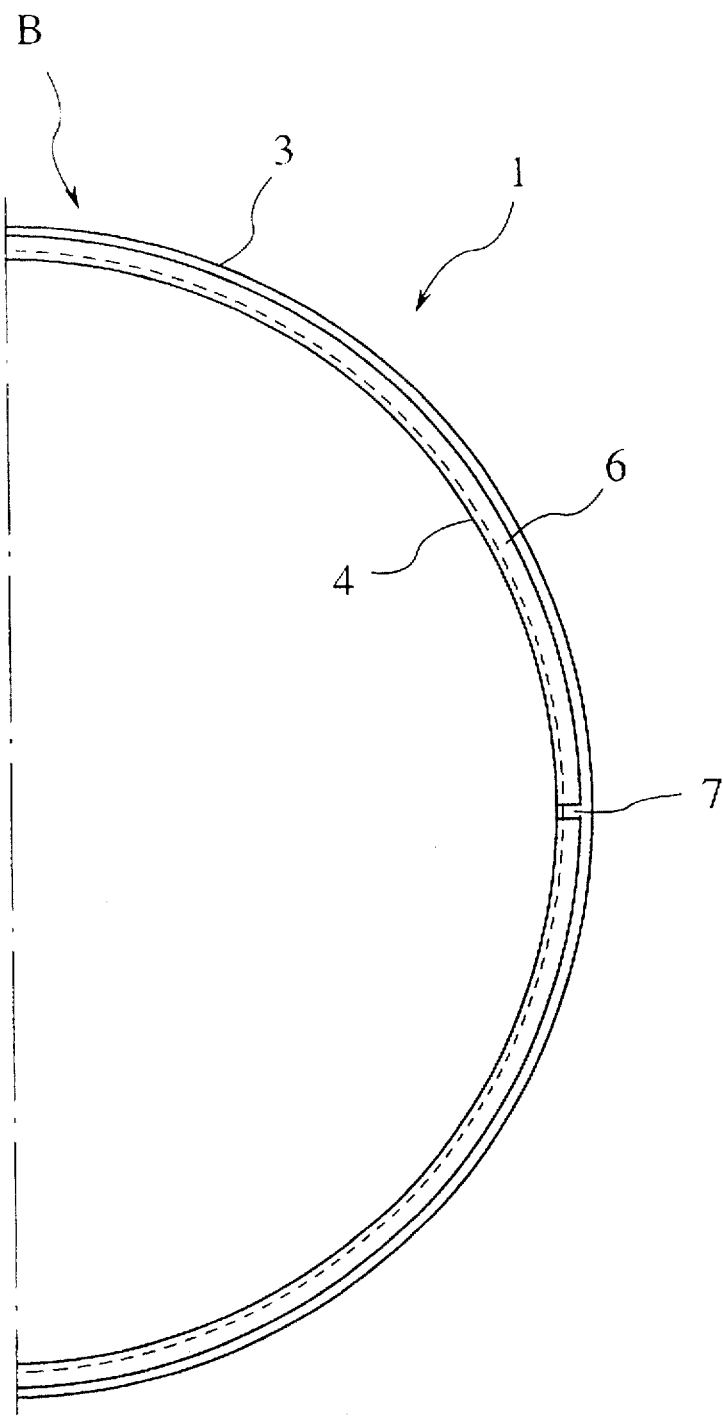
FIG. 6 is a right elevational side view partially showing the rotor according to the same embodiment.
Figure 7:
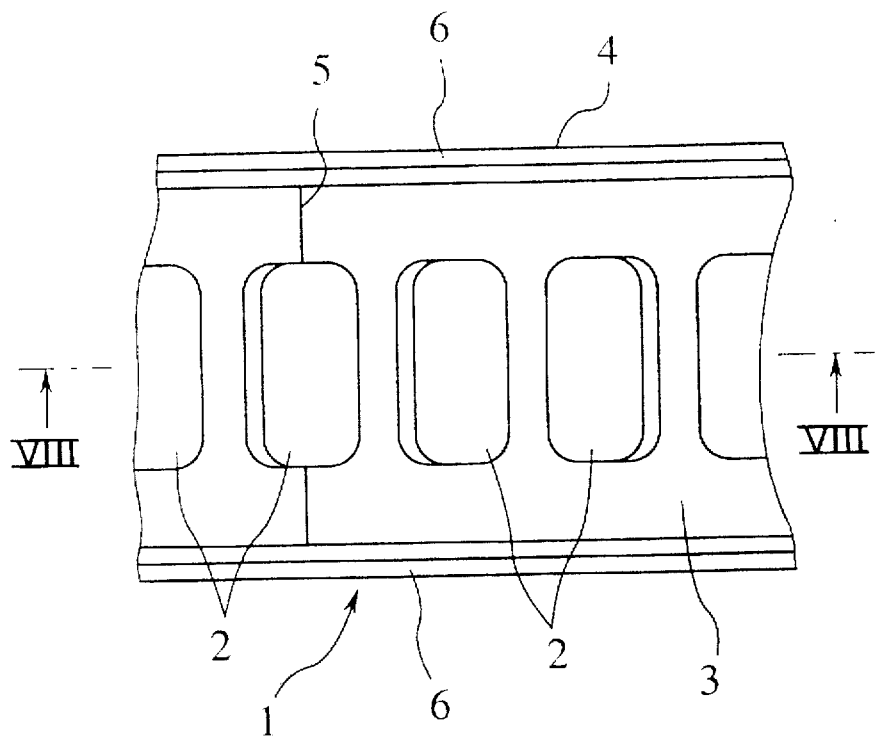
FIG. 7 is an illustration of the rotor viewed from an arrow B in FIG. 6.
Figure 8:
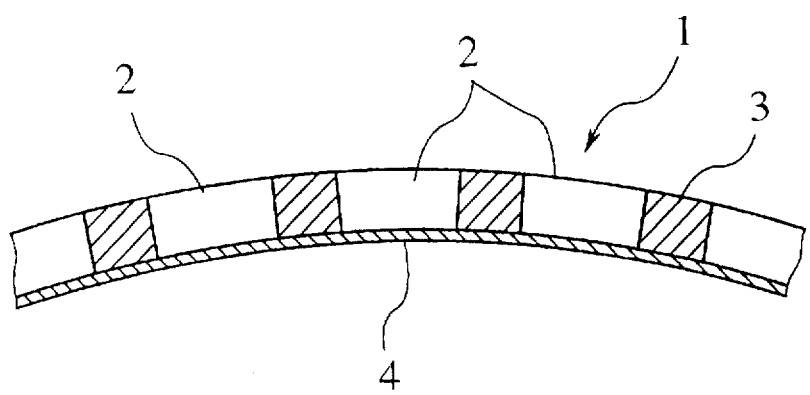
FIG. 8 is a cross-sectional view taken along line C—C in FIG. 7.

Referring now to FIGS. 4 to 9, a description will be made in terms of an embodiment of the present invention. In FIGS. 4 to 9, a rotor, generally designated at reference numeral 1, comprises a ring-like rotor body 3 having a number of rectangular holes 2 made successively along a circumferential direction at an equal pitch, and an inner ring 4 tightly inserted or fitted into the interior of the rotor body 3. For the formation of the rotor body 3, a flat stainless steel plate having the number of holes 2 previously punched is rolling-formed into a ring-like configuration, before its both ends are abutted against each other and welded. The welded portion is denoted at reference numeral 5 in FIG. 7. On the other hand, the inner ring 4 is equipped with flange sections 6 folded to protrude outwardly at its both axial end portions. The dimension between the flange sections 6 is designed to be slightly larger than the width of the rotor body 3. In addition, as shown in FIG. 5 clearances (gaps) G are made between the rotor body 3 and the inner ring 4 in the axial directions.

For manufacturing of the inner ring 4, a flat stainless steel plate having a smaller thickness than that for the rotor body 3 is rolling-formed into a ring-like configuration, whereas its both ends face each other but remains as they are to form an abutment portion 7 without being welded. With the abutment portion 7, the inner ring 4 has a generally C-shaped cross section, which allows the inner ring 4 per se to be deformable in diameter-reducing directions due to the self-elasticity.

Accordingly, as will be described later, in a state in which the inner ring 4 is elastically deformed in the diameter-reduction directions so that one of both ends defining the abutment portion 7 is overlapped with the other end and the maximum diameter of the flange sections 6 becomes smaller than the inner diameter of the rotor body 3, and held in that condition before the inner ring 4 is fitted into the interior of the rotor body 3. When being released from the deforming force, the inner ring 4 returns to its original state due to the self-elastic force so as to be placed closely into contact with the inner circumference of the rotor body 3 to keep the engaged relation to the rotary body 3.

In this embodiment, the rotor body 3 is made of a stainless steel plate (for example, SUS430) having a thickness of 2.0 mm, while the inner ring 4 is made of a stainless steel plate (for example, SUS304 or SUS 430) having a thickness of 0.3 mm. In addition, the flange section 6 of the inner ring 4 may be provided at at least one of both the ends.

Figure 1:
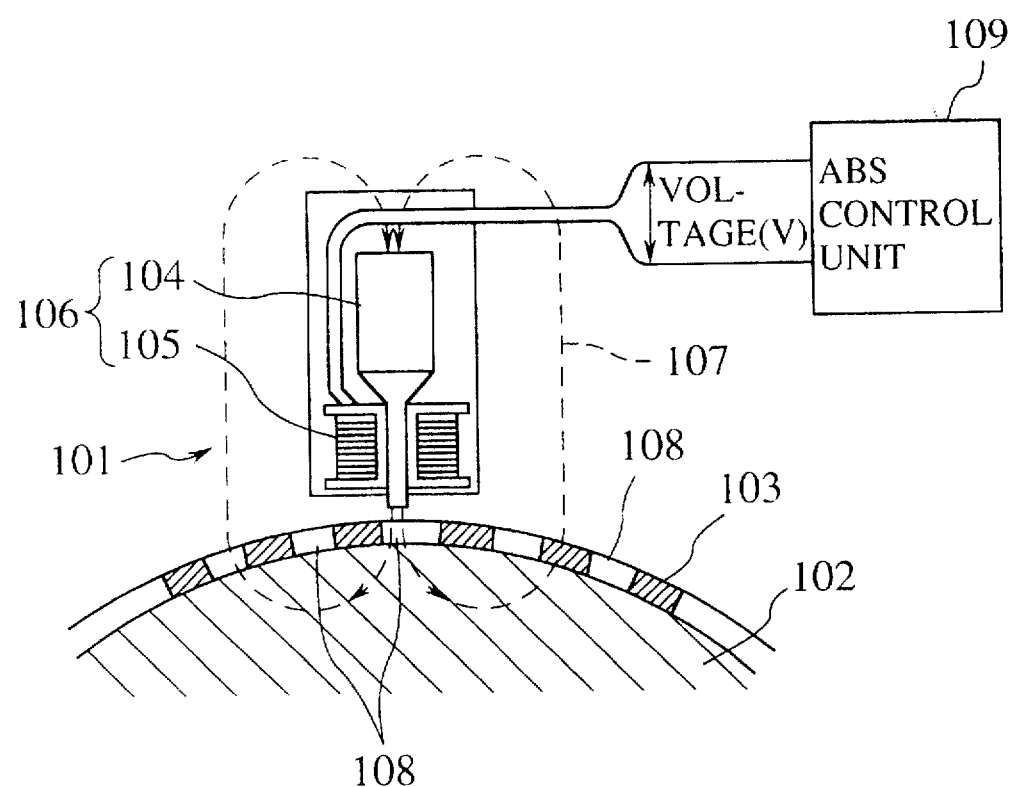
FIG. 1 is a cross-sectional view showing a known basic structure of an ABS wheel speed sensor.
Figure 2:
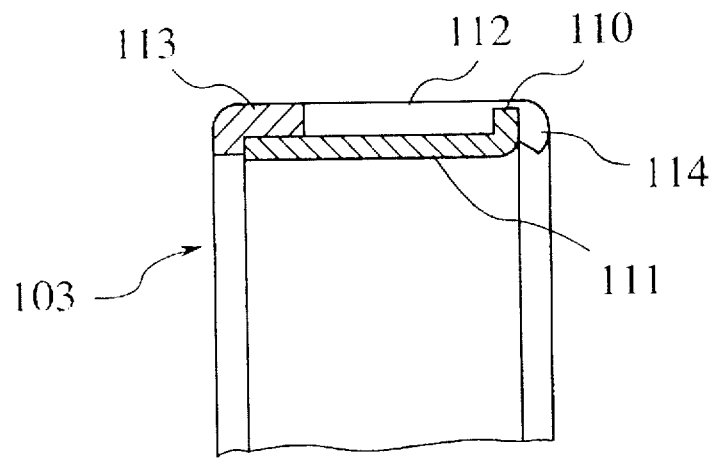
FIG. 2 is a cross-sectional view showing a conventional rotor for an ABS wheel speed sensor.
Figure 3:
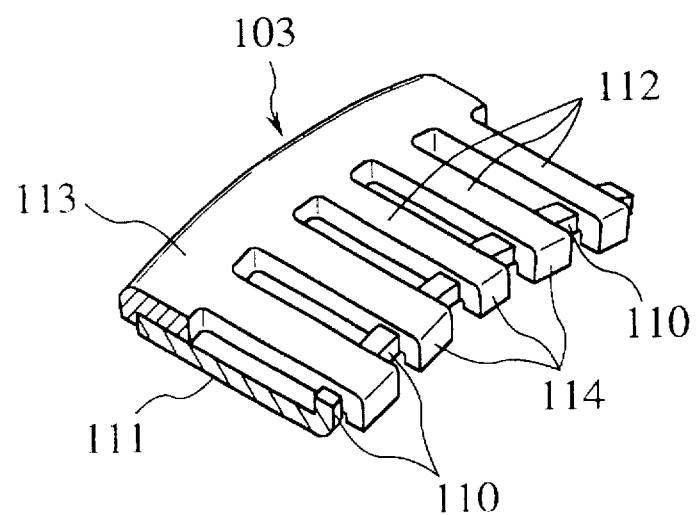
FIG. 3 is an enlarged perspective view showing a principal portion of the rotor.
Figure 4:
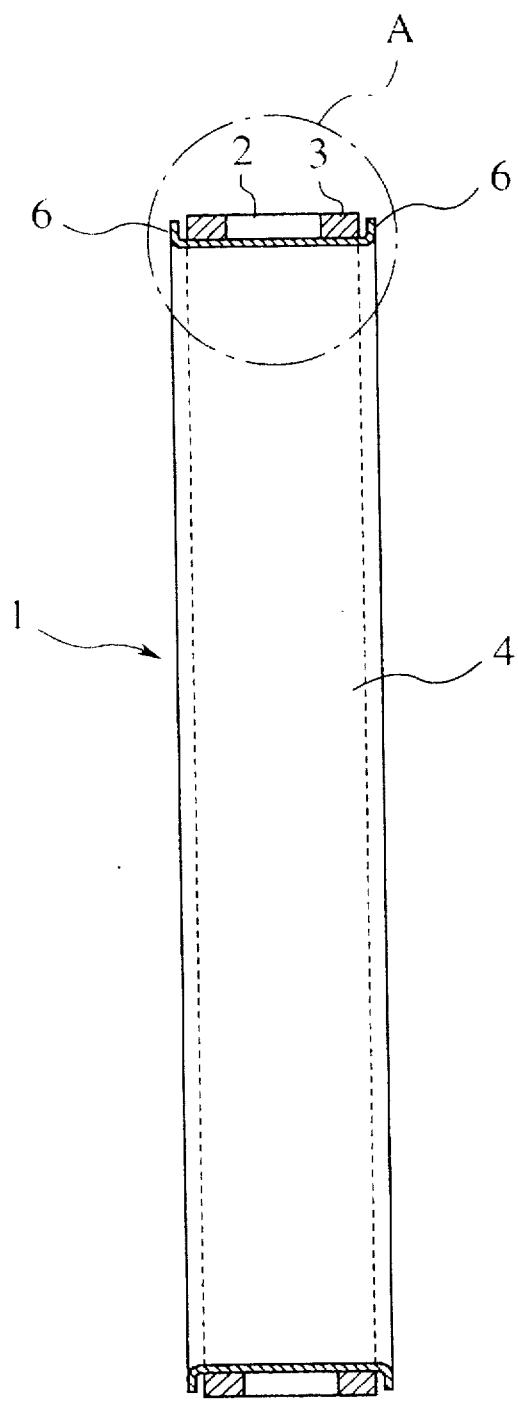
FIG. 4 is an enlarged cross-sectional view showing a construction of a rotor according an embodiment of the present invention.
Figure 9:
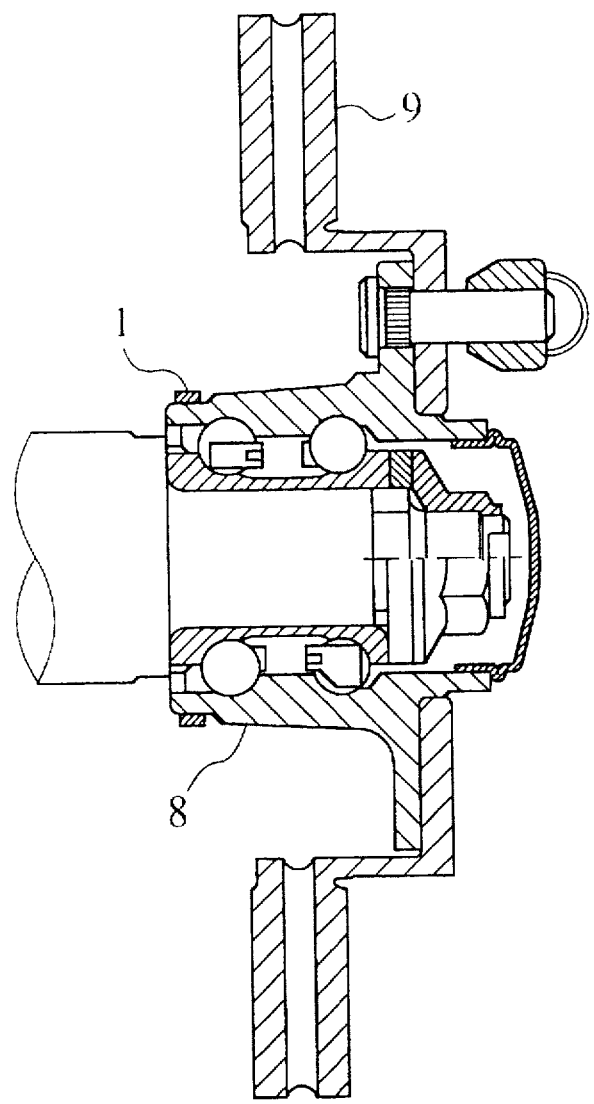
FIG. 9 is a cross-sectional view showing a principal portion of a hub on which the rotor for the ABS wheel speed sensor is mounted.

The rotor 1 thus constructed is fitted and fixed onto one end portion of a hub 8 being the mating rotary shaft as shown in FIGS. 5 and 9. A sensor body, not shown, is placed around the rotor 1 so as to come into opposed relation thereto, thus demonstrating a wheel speed sensing function as well as the conventional wheel speed sensor shown in FIG. 1. Incidentally, the hub 8 shown in FIG. 9, together with a brake disk 9, comes into connection with a wheel, not shown.

Figure 10:
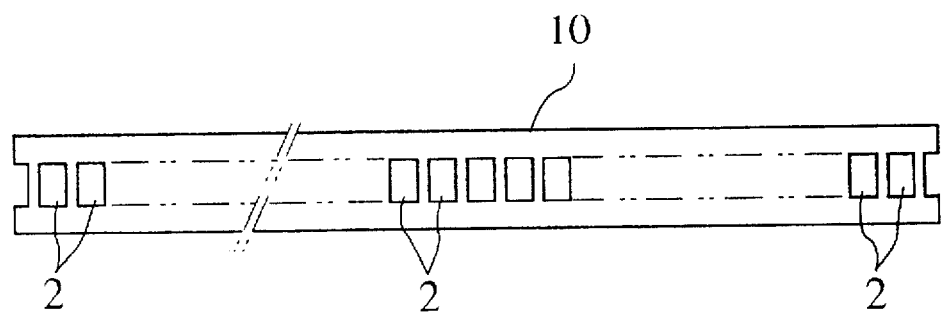
FIG. 10 is a plan view showing a steel plate material for a rotor body of the rotor after hole-formation.
Figure 11:
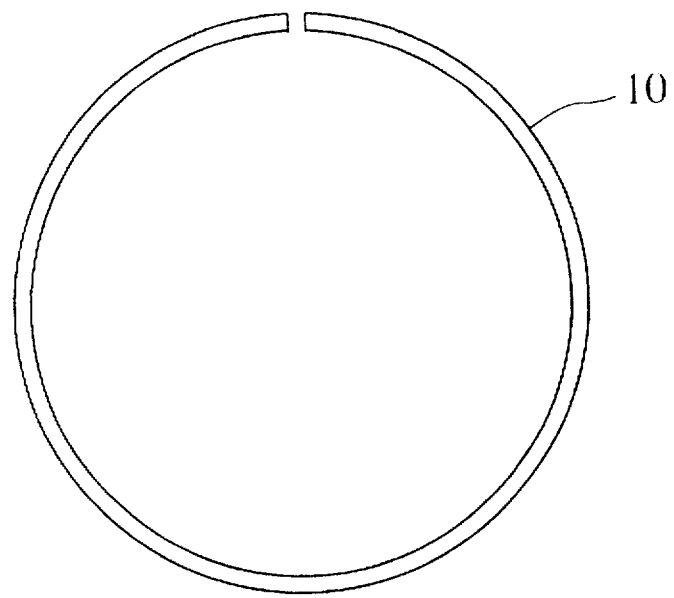
FIG. 11 is a front elevational view showing a steel plate for the rotor body rolling-processed.
Figure 12:
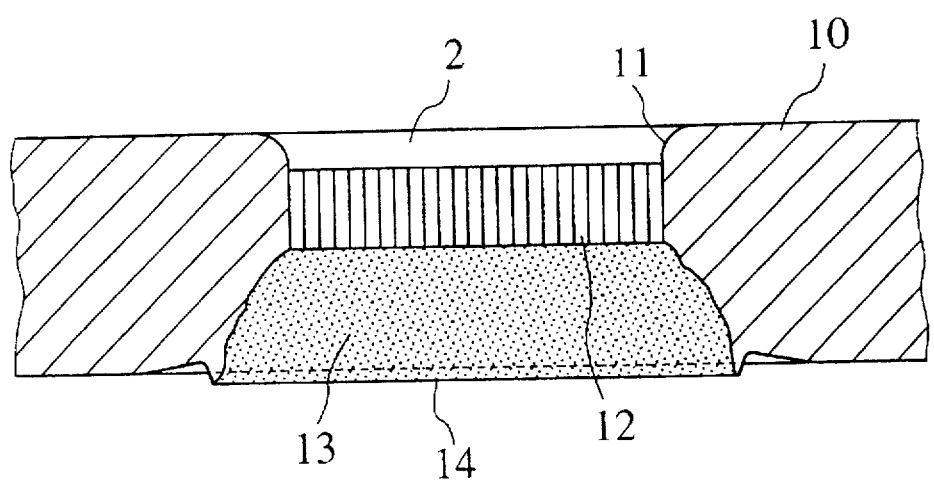
FIG. 12 is an enlarged cross-sectional view useful for describing a state of a hole made in the rotor body.

Secondly, a description will be made hereinbelow of a procedure of manufacturing the aforesaid rotor 1. For manufacturing the rotor 1, first of all, as shown in FIG. 10 a belt-like flat stainless steel plate being a base material is punching-formed into a predetermined configuration to make a material 10, which is further punching-processed using a press to make a number of holes 2 arranged successively at an equal pitch. Thereafter, as shown in FIG. 11 the hole-processed material 10 is rolling-formed and rounded into a ring-like configuration. At this time, as shown in FIG. 12 the inner wall surface of each of the punching-made holes 2 includes a shear drop portion 11, a shorn portion 12, a broken portion 13, and a burr portion 14. Of these, the shorn portion 12 is finished to be relatively clear and to accurately conform with the shape of the hole-making punch used, while the broken portion 13 tends to become unstable in cut configuration.

For this reason, in the rolling-formation, the shorn surface portions 12 of the holes 2 are made to be positioned at the outer circumference side, which can more improve the pitch accuracy of the holes 2 of the rotor 1 and further raise the performance of sensing wheel rotation.

Figure 13:
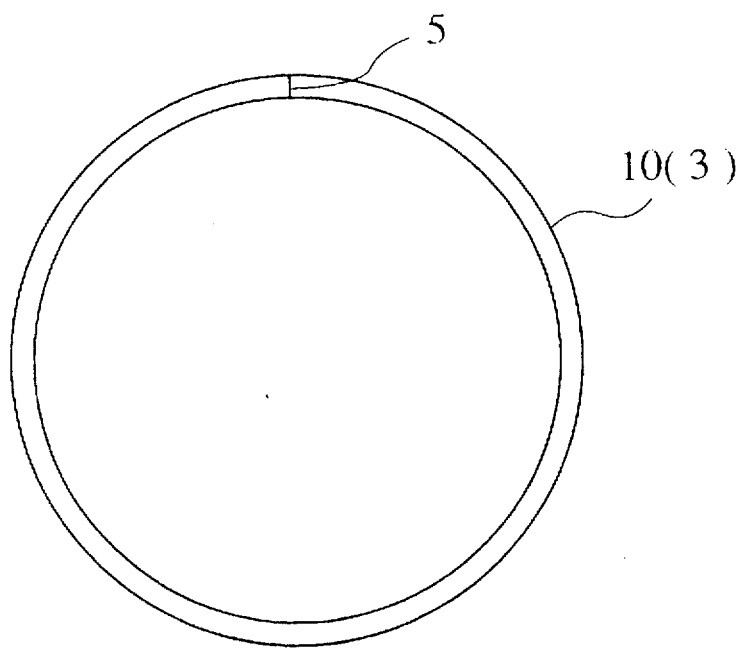
FIG. 13 is a front elevational view showing the rotor body rolling-processed.
Figure 14:
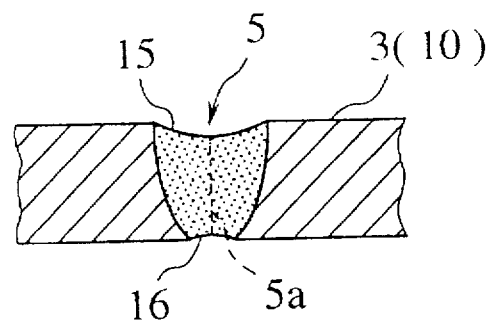
FIG. 14 is an enlarged cross-sectional view showing a welded portion of the rotor body.

Following these processes, as shown in FIG. 13 both the ends of the ring-like material 10 previously rolled are plasma-welded in a state with being abutted against each other. In this welding, as shown in FIG. 14 an plasma arc is radiated to over both side base material portions interposing an abutment plane 5a therebetween so that both the base material portions are partly molten and joined to each other. The specialty of the plasma welding method develops indentations 15, 16 in both the surfaces of the welded portion but not producing projections on the surfaces thereof. Accordingly, the plasma welding method does not require an after-processing such as a deburring operation at all. It is also appropriate to employ other welding methods which utilize a high-density melting energy such as a laser welding and a TIG welding in place of the aforesaid plasma welding method.

Figure 15:
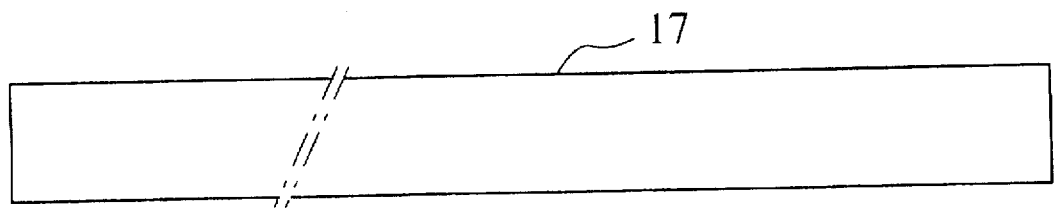
FIG. 15 is a plane view showing a steel plate material for an inner ring of the rotor.
Figure 16:
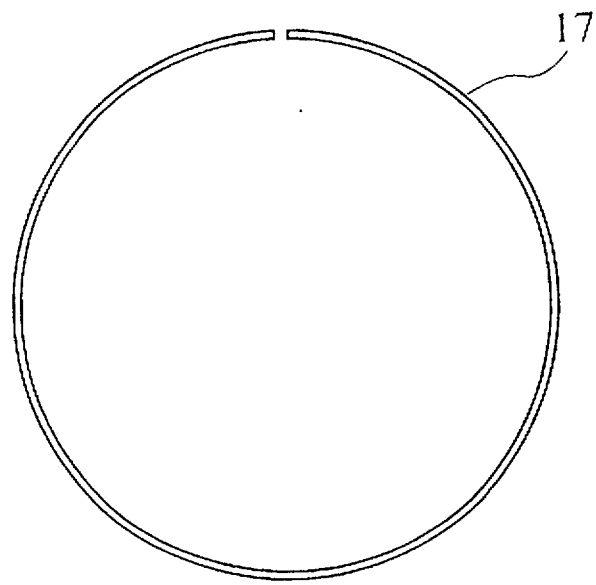
FIG. 16 is a front elevational view showing the steel plate material for the inner ring rolling-processed.
Figure 17:
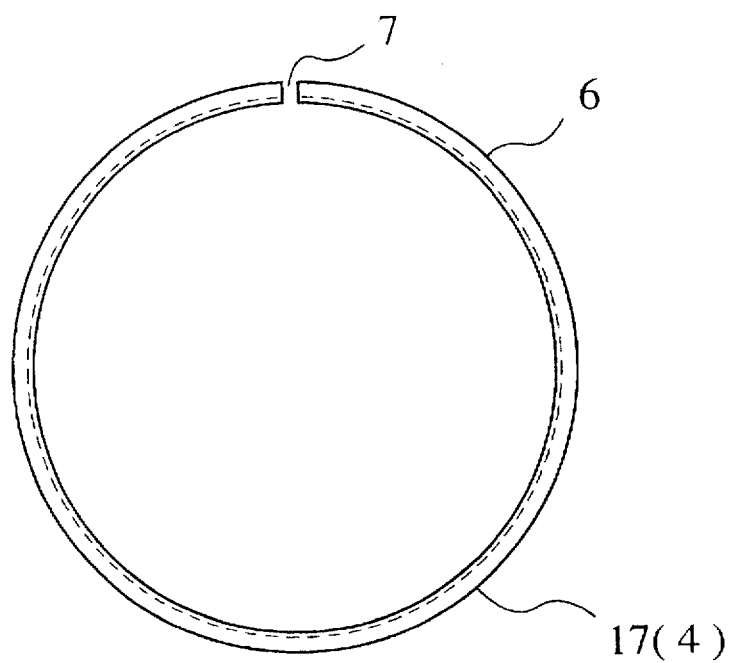
FIG. 17 is a front elevational view showing the steel plate material which has flange sections formed.
Figure 18:
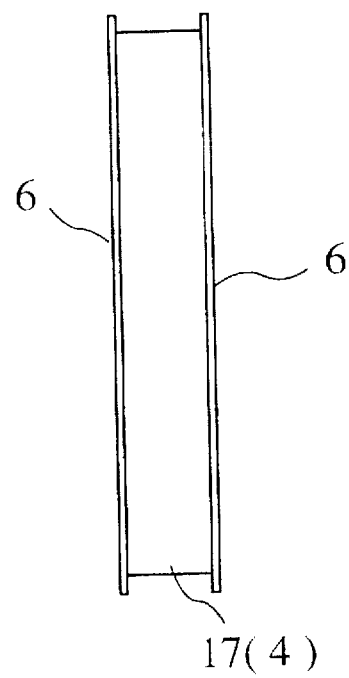
FIG. 18 is a right side elevational view showing the FIG. 17 steel plate material.

Going the other way, for manufacturing the inner ring 4 to be combined with the rotor body 3, as shown in FIGS. 15 and 16, a belt-like flat stainless steel plate is punched and formed into a given configuration, and the resultant material 17 is rolling-formed and rounded into a ring-like configuration, before as shown in FIGS. 17 and 18 both axial end portions of the rolling-formed material 17 are spinning-processed so as to bendably form flange sections 6. Unlike the rotor body 3, both the ends of this inner ring 4 remain as the abutment portion 7 as they are without being welded. Therefore, the inner ring 4 having a C-shaped cross section is elastically deformable in the diameter-reducing directions by the utilization of the self-elasticity.

Figure 19:
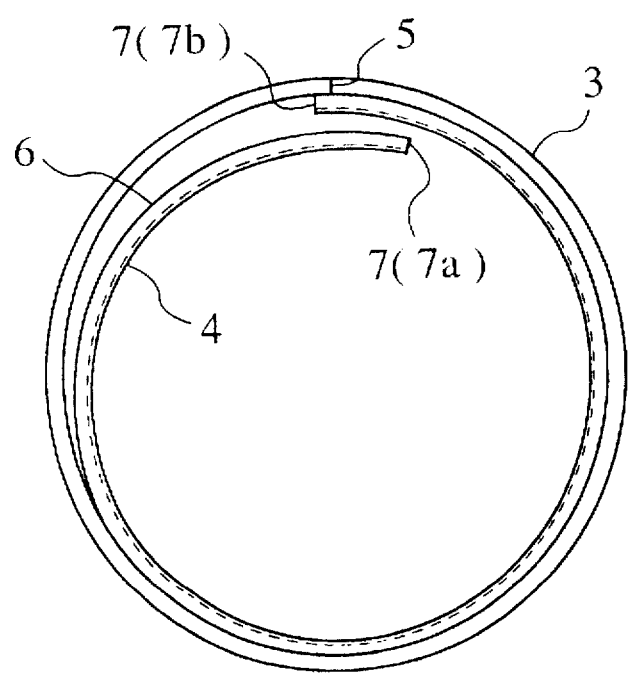
FIG. 19 is an illustration available for describing a connection of the rotor body and the inner ring.
Figure 20:
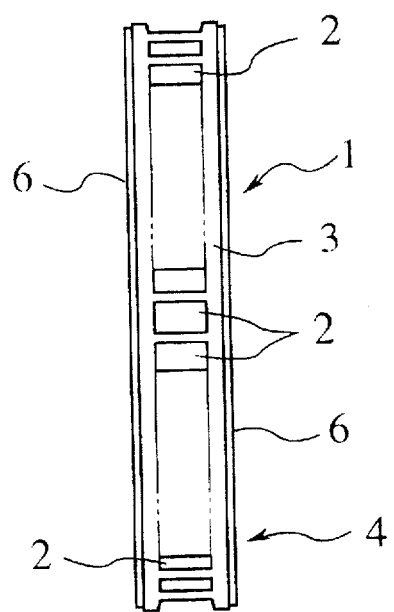
FIG. 20 is a side elevational view showing the rotor body and the inner ring combined with each other to make up the rotor.

Subsequently, the rotor body 3 is combined with the inner ring 4. In this instance, as shown in FIG. 19 the inner ring 4 is elastically deformed in the diameter-reducing directions so that one (7a) of both the ends 7a and 7b is overlapped with the other (7b). More specifically, the inner ring 4 is elastically deformed so that the maximum diameter of the flange sections 6 of the inner ring 4 is reduced to be smaller than the inner diameter of the rotor body 3, and held in that condition. Following this, the inner ring 4 elastically deformed in the diameter-reducing directions is fitted into the interior of the rotor body 3, before being released from the deforming force, with the result that the inner ring 4 returns to its original state due to its self-elastic force so as to be brought closely and tightly into contact with the inner circumference of the rotor body 3, thereby, as shown in FIG. 20, getting into firm connection with the rotor body 3 to assemble the rotor 1.

As described above, according to this embodiment of this invention, the inner ring 4 can be pressed in the diameter-reducing directions by the help of its self-elasticity and fitted into the interior of the rotor body 3, before coming into combination with the rotor body 3 when being released from the deforming force. This construction can exceedingly improve the work effectiveness at assembly.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A rotor for an ABS wheel speed sensor, comprising:
   a ring-like rotor body having a number of holes arranged successively at an equal pitch; and
   a C-shaped inner ring fitted in an interior of said rotor body by elastic restoring forces and having, at at least one of its axial end portions, a flange section bent and protruding outwardly;
   an inner circumferential surface of said C-shaped inner ring being fitted onto a mating rotary shaft from the flange side under pressure.

2. An apparatus as defined in claim 1, wherein an abutment portion is provided between adjacent ends of said C-shaped inner ring when said C-shaped inner ring is fitted in the interior of said rotor body.

wherein said C-shaped inner ring does not cover an entire inner circumferential surface of said rotor body when fitted in the interior of said rotor body.

3. An apparatus as defined in claim 1, wherein the elastic restoring forces prevent said C-shaped inner ring from slipping on the interior of said rotor body, and whereby said ABS wheel speed sensor can accurately measure a speed of a wheel as a result thereof.

4. An apparatus as defined in claim 3, wherein said C-shaped inner ring presses against the interior of said rotor body due to said elastic restoring forces being applied along a plane perpendicular to a center axis of said C-shaped inner ring, so as to create a tight fit between the interior of said rotor body and said C-shaped inner ring.

5. A method of manufacturing a rotor for an ABS wheel speed sensor, comprising the steps of:

rolling-forming a flat steel plate material with a number of holes punched at an equal pitch into a ring-like configuration;

abutting both ends of said rolling-formed steel plate material against each other and welding both the ends to fabricate a rotor body;

rolling-forming another flat steel plate material so that said other steel plate material has a generally C-shape;

forming, at at least one of both axial end portions of the other rolling-formed steel plate material, a flange section bent and protruding outwardly to fabricate an inner ring, and inserting said inner ring into an inside of said rotor body in a state where said inner ring is elastically deformed in a diameter-reducing direction so that an outer circumferential surface of said inner ring is brought closely into contact with an inner surface of said rotor body under pressure.

6. A method as defined in claim 5, wherein;

for rolling-forming said rotor body steel plate material having a number of holes punching-made successively at an equal pitch, a shorn surface portion of the punching-made surface of each of said holes is positioned at its outer circumferential surface side.

7. A method as defined in claim 6, wherein;

for abutting both the ends of the rolling-formed rotor body steel plate material to weld both the ends thereof, a high-density melting energy is applied so that steel plate material portions at both sides of an abutment surface are molten.

8. A method as defined in claim 5, wherein;

for abutting both the ends of the rolling-formed rotor body steel plate material to weld both the ends thereof, a high-density melting energy is applied so that steel plate material portions at both sides of an abutment surface are molten.

9. A rotor for an ABS wheel speed sensor, comprising:

a ring-like rotor body having a number of holes arranged successively at an equal pitch; and an inner ring having a C-shape with respect to a cross-section perpendicular to a center axis of said inner ring, said inner ring being fitted in an interior of said rotor body by elastic restoring forces and having, at at least one of its axial end portions, a flange section bent and protruding outwardly;

an inner circumferential surface of said inner ring being fitted onto a mating rotary shaft from the flange side under pressure.

10. An apparatus as defined in claim 9, wherein an abutment portion is provided between adjacent ends of said inner ring when said inner ring is fitted in the interior of said rotor body, wherein said inner ring does not cover an entire inner circumferential surface of said rotor body when fitted in the interior of said rotor body.

11. An apparatus as defined in claim 9, wherein the elastic restoring forces prevent said inner ring from slipping on the interior of said rotor body, and whereby said ABS wheel speed sensor can accurately measure a speed of a wheel as a result thereof.

12. An apparatus as defined in claim 11, wherein said inner ring presses against the interior of said rotor body due to said elastic restoring forces being applied along a plane perpendicular to a center axis of said inner ring, so as to create a tight fit between the interior of said rotor body and said inner ring.

* * * * *